US008964749B2

(12) United States Patent
Cao et al.

(10) Patent No.: US 8,964,749 B2
(45) Date of Patent: Feb. 24, 2015

(54) METHOD, DEVICE AND SYSTEM FOR ESTABLISHING A PSEUDO WIRE

(75) Inventors: Wei Cao, Santa Clara, CA (US); Li Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 13/340,101

(22) Filed: Dec. 29, 2011

(65) Prior Publication Data

US 2012/0099598 A1 Apr. 26, 2012

Related U.S. Application Data

(63) Continuation of application No. PCT/CN2009/072504, filed on Jun. 29, 2009.

(51) Int. Cl.
*H04L 12/721* (2013.01)
*H04L 12/751* (2013.01)

(52) U.S. Cl.
CPC ................ *H04L 45/68* (2013.01); *H04L 45/02* (2013.01)
USPC ....... 370/392; 370/351; 370/389; 370/395.53

(58) Field of Classification Search
USPC .............................. 370/351, 389, 392, 395.53
See application file for complete search history.

(56) References Cited

U.S. PATENT DOCUMENTS

| 7,613,188 | B1 | 11/2009 | French et al. | |
| 2008/0056136 | A1* | 3/2008 | Carbunar et al. | 370/238 |
| 2008/0253367 | A1* | 10/2008 | Ould-Brahim | 370/389 |
| 2009/0141721 | A1 | 6/2009 | Filsfils | |
| 2010/0020719 | A1* | 1/2010 | Chu et al. | 370/254 |
| 2010/0118874 | A1 | 5/2010 | Li | |
| 2011/0026530 | A1 | 2/2011 | Du et al. | |

FOREIGN PATENT DOCUMENTS

| CN | 1722726 A | 1/2006 |
| CN | 101005443 A | 7/2007 |
| CN | 101355490 A | 1/2009 |

(Continued)

OTHER PUBLICATIONS

Florin Balus, et al., "Multi-Segment Pseudowire Setup and Maintenance using LDP", Jul. 2005, 23 pages.*

(Continued)

*Primary Examiner* — Un C Cho
*Assistant Examiner* — Siming Liu

(57) ABSTRACT

A method, a device and a system for establishing a Pseudo Wire (PW) are provided. The method includes: receiving, by a switching node, a control message; constructing a first control message according the first FEC information and the routing information in the control message, and sending the first control message to a second terminal node; constructing, by the second terminal node, a second control message, where the second control message includes the second FEC information and the second routing information, and the second FEC information carries identification information of the first terminal node; and sending the second control message to the switching node. In the method, it is unnecessary to manually configure a PW routing table on the switching node or establish a PW routing table dynamically through a routing protocol, and it is unnecessary to configure mapping relations between PW segments manually. This method achieves robust maintenance.

6 Claims, 4 Drawing Sheets

(56) References Cited

FOREIGN PATENT DOCUMENTS

| CN | 101414979 A | 4/2009 |
|---|---|---|
| CN | 101433030 A | 5/2009 |
| WO | WO 2007/022640 A1 | 3/2007 |
| WO | WO 2009/013582 A1 | 1/2009 |

OTHER PUBLICATIONS

Written Opinion of the International Searching Authority dated Mar. 18, 2010 in connection with International Patent Application No. PCT/CN2009/072504.

Supplementary European Search Report dated Sep. 11, 2012 in connection with European Patent Application No. EP 09 84 6669.

B. Jamoussi, et al., "Constraint-Based LSP Setup using LDP", Jan. 2002, 43 pages.

International Search Report dated Mar. 18, 2010 in connection with International Patent Application No. PCT/CN2009/072504.

Luca Martini, et al., "Dynamic Placement of Multi Segment Pseudo Wires", Network Working Group, Mar. 9, 2009, 20 pages.

Search Report dated Jan. 30, 2013 in connection with Chinese Patent Application No. 200980158251X.

Office Action dated Feb. 27, 2013 in connection with Chinese Patent Application No. 200980158251.X.

\* cited by examiner

| G PWid (0x81) | C | PW Type | PW info Length |
|---|---|---|---|
| AGI type | Length | value | |
| AGI value (contd.) | | | |
| AII Type | Length | value | |
| SAII Value (contd.) | | | |
| AII type | Length | value | |
| TAII value (contd.) | | | |

METHOD, DEVICE AND SYSTEM FOR ESTABLISHING A PSEUDO WIRE

CROSS-REFERENCE TO RELATED APPLICATIONS

This application is a continuation of International Application No. PCT/CN2009/072504, filed on Jun. 29, 2009, which is hereby incorporated by reference in its entirety.

TECHNICAL FIELD

The present invention relates to the field of communications, and in particular, to a method, a device and a system for establishing a Pseudo Wire.

BACKGROUND

A Pseudo Wire (PW) provides a service emulation technology, including a point to point method and a point to multipoint method. A Provider Edge (PE) equipment performs simulation on user data through operations of encapsulation and decapsulation of received Customer Edge (CE) data.

As an edge to edge layer 2 service transport technology, the PW may be applied in a Layer 2 Virtual Private Network (L2VPN), and may be used to provide a Virtual Private Wire Service (VPWS), and a Virtual Private LAN Service (VPLS). Based on the requirements of the network interworking in the continuously extending network, strict security requirements must be guaranteed in the network. Therefore, a Multi-Segment Pseudo Wire (MS-PW) needs to be established for service transport, so as to satisfy the need of edge to edge service emulation crossing multiple Provider Service Networks (PSNs). On the other hand, because the network continuously enlarges, the number of network equipment increases accordingly. The full or partially full network connections between equipment in the network must be deployed, if point to point PW is used for service transport. This will cause certain troubles during network deployment. MS-PW which must be used to reduce the quantity of sessions between the equipment.

In particular, in a fixed-mobile convergence (FMC) network, MS-PWs are also needed. The services, such as Time Division Multiplexer (TDM) and Asynchronous Transfer Mode (ATM) must be transmitted by Pseudo Wire between Cell Site Gateway (CSG) and Mobile Aggregation Site Gateway (MASG). Because masses of CSGs, the targeted label distribution protocol (T-LDP) sessions is the challenge for MASG, MS-PWs are also required.

Currently, the MS-PW could be deployed via static configuration or dynamic protocols. During the static configuration, a MS-PW should be established segment by segment, then mapping relations between PW segments are established. As shown in FIG. 1, in order to statically configure a MS-PW between a terminal node 100 and a terminal node 140, it needs to statically configure PW105 and PW115 between the terminal node 100 and a switching node 120, and statically configure PW125 and PW135 between the switching node 120 and the terminal node 140, and then manually configure mapping relations for PW segments on the switching node 120, for example, mapping relations between PW Identifiers (IDs), such as a mapping relation between a PW ID of PW105 and a PW ID of PW125, and a mapping relation between a PW ID of PW 115 and a PW ID of PW135. Based on these static configurations, the PW between the terminal node 100 and the terminal node 140 is deployed. However, when multiple switching nodes or multiple MS-PWs exist between the terminal node 100 and the terminal node 140, the workload for manual configuration is very heavy; additionally maintenance of MS-PWs is complicated.

The PW could be established dynamically by two steps: statically configuring or dynamically establishing a PW routing table, establishing the MS-PW by using Label Distribution Protocol (LDP). As shown in FIG. 1, in order to establish PWs between the terminal node 100 and the terminal node 140, it first needs to establish a PW routing table via manually configuring or a routing protocol on the switching node 120. Then, the terminal node 100 sends LDP signaling for establishing PW segments between the terminal node 100 and the switching node 120. After receiving the LDP signaling, the switching node 120 queries the configured PW routing table, and then initiates LDP signaling for establishing PW segments between the switching node 120 and the terminal node 140. During dynamic establishment of an MS-PW, a PW routing table must be deployed on a switching via manually configuring or dynamically based on a complicated protocol Therefore, when multiple switching nodes or multiple MS-PWs exist, the workload of manually configuring the PW routing table on the switching node is very heavy. On the other hand, there is a strict capability requirement for equipment in order to introduce routing protocols. In addition, it is complicated to establish the PW routing table.

SUMMARY

An embodiment of the present invention provides a method, a device and a system for establishing a PW, and the method, device and system may automatically establish a PW between terminal nodes.

An embodiment of the present invention provides a method for establishing a PW, where the method includes:

receiving, by a switching node, a control message, where the control message carries first Forwarding Equivalence Class (FEC) information and routing information;

constructing, by the switching node, a first control message according to the control message, and sending the first control message to a second terminal node;

constructing, by the second terminal node, a second control message based on the first control message, wherein the second control message carries second FEC information and second routing information according to the first control message, and the second FEC information carries identification information of a first terminal node; and sending, by the second terminal node, the second control message to the switching node according to the second routing information.

An embodiment of the present invention provides a terminal node, where the terminal node includes:

a message receiving module, configured to receive a first control message from a switching node, where the first control message carries first FEC information and routing information;

a message processing module, configured to construct a second control message according to the first control message received by the message receiving module, where the second control message carries second FEC information and second routing information, and the second FEC information carries identification information of a first terminal node; and a message sending module, configured to send the second control message constructed by the message processing module to the switching node.

An embodiment of the present invention provides a terminal node, where the terminal node includes:

a storage module, configured to store first FEC information and first routing information, or configured to store first FEC information, first routing information and second routing information, where the first FEC information carries identification information of a target terminal node;

a message processing module, configured to construct a control message carrying the first FEC information and the first routing information when the first FEC information and the first routing information are stored in the storage module; or configured to construct a control message carrying the first FEC information, the first routing information and the second routing information when the first FEC information, the first routing information and the second routing information are stored in the storage module; and a message sending module, configured to send the control message constructed by the message processing module to a switching node between the terminal node and the target terminal node according to the first routing information.

An embodiment of the present invention provides a switching node, where the switching node includes:

a receiving module, configured to receive a control message, where the control message carries FEC information and routing information;

a processing module, configured to obtain identification information of a next hop node according to the routing information in the control message received by the receiving module, and construct a first control message according to the control message; and a sending module, configured to send the first control message to a node corresponding to the identification information according to the identification information obtained by the processing module.

An embodiment of the present invention provides a system for establishing a PW, where the system includes a first terminal node, a second terminal node and a switching node, and the first terminal node is connected to the second terminal node through the switching node, and the first terminal node is configured to construct a control message, where the control message carries first FEC information and routing information and the first FEC information carries identification information of the second terminal node; send the control message to the switching node according to the routing information; and receive the control message of the switching node;

the switching node is configured to receive the control message, construct a first control message according to a received control message, obtain identification information of a next hop node according to the routing information in the received control message, and send the first control message to a node corresponding to the identification information according to the obtained identification information; and the second terminal node is configured to receive the control message of the switching node; construct a second control message according to a received control message, where the second control message carries second FEC information and second routing information, and the second FEC information carries identification information of the first terminal node; and send the second control message to the switching node according to the second routing information.

In the method, the device and the system for establishing a PW according to the embodiment of the present invention, a control message carries PW routing information, that is, identification information of a passed intermediate switching node, required for establishing a PW between two terminal nodes, so that when receiving the control message, the switching node may forward the control message according to the identification information. During the process, routing table information required by the PW is not required to be configured manually or established through dynamic signaling, and mapping relations between PWs are not required to be established manually either. An intermediate forwarding process is automatically performed by the switching node and is applicable to situations of multiple switching nodes, which may reduce workload caused by manual operations and reduce introduction of complicated dynamic signaling, and is easy for management.

DETAILED DESCRIPTION

To make the purposes, technical solutions and advantages of the present invention clearer, the present invention is further illustrated below in detail with reference to the accompanying drawings and embodiments. It should be understood that, the embodiments described herein are used to explain the present invention, but not intended to limit the present invention.

Figure 1:
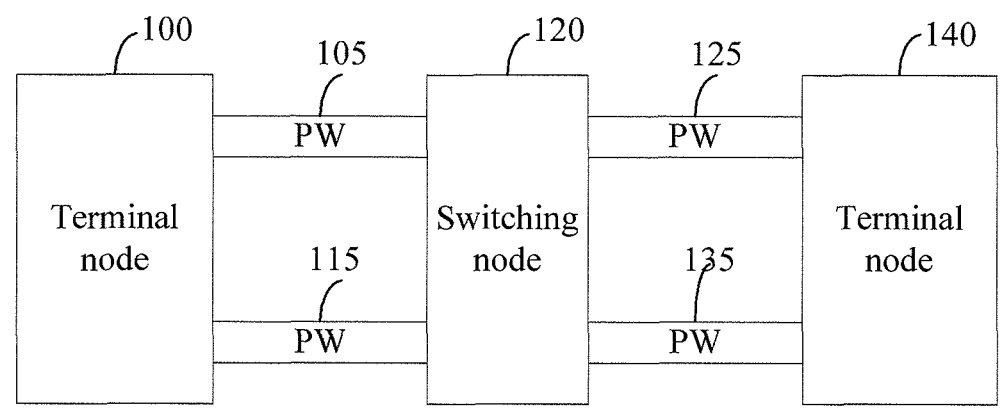
FIG. 1 is a schematic diagram of a PW establishing process in the prior art.
Figure 2:
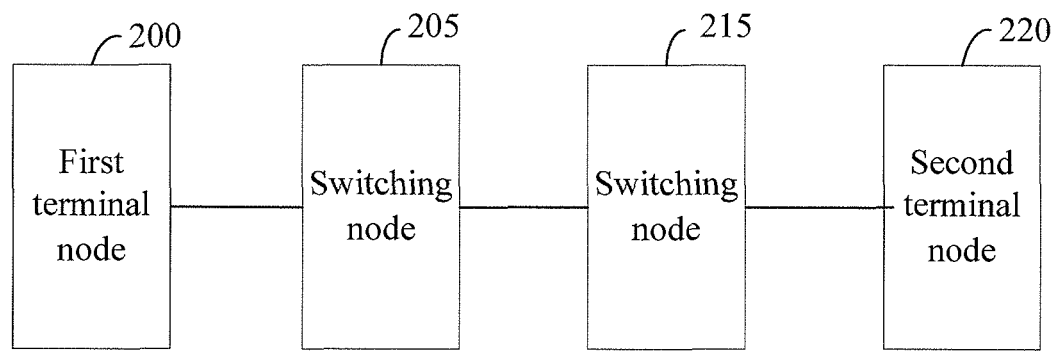
FIG. 2 is a schematic diagram of a system architecture including a terminal node and a switching node according to an embodiment of the present invention.

As shown in FIG. 2, a PW is to be established between a first terminal node 200 and a second terminal node 220 according to an embodiment of the present invention, where multiple switching nodes may be deployed between the first terminal node 200 and the second terminal node 220, or no switching node may be included between the first terminal node 200 and the second terminal node 220. Persons skilled in the art should understand that a method used when no switching node is included is the same as that in the prior art, so the method is not described herein. In the embodiment of the present invention, a situation that two switching nodes are deployed between the first terminal node 200 and the second terminal node 220 is taken as an example, where the two switching nodes are a switching node 205 and a switching node 215. The first terminal node 200 and the second terminal node 220 may be a terminal node provider edge router (TPE), and the switching node 205 and the switching node 215 may be a switching node provider edge router (SPE).

An embodiment of the present invention provides a method for establishing a PW, and the idea of the method is to send a control message carrying routing information between the first terminal node 200 and the second terminal node 220, where the routing information includes identification information of an intermediate switching node. In this way, after receiving the control message, the intermediate switching node may forward the message according to the routing information in the control message. A specific process is as shown in FIG. 3, which includes the following steps:

Step 300: The first terminal node 200 sends a control message carrying a PW label, first Forwarding Equivalence Class (FEC) information and first routing information to the switching node 205.

The control message may be an existing label mapping message, for example, a Label Mapping message, and the PW label carried in the control message is a PW label assigned to a next node by the first terminal node 200. The PW label in this embodiment is Label1, a structure of which may be similar to that of an existing Label Switched Path (LSP) label.

Figures 3, 4:
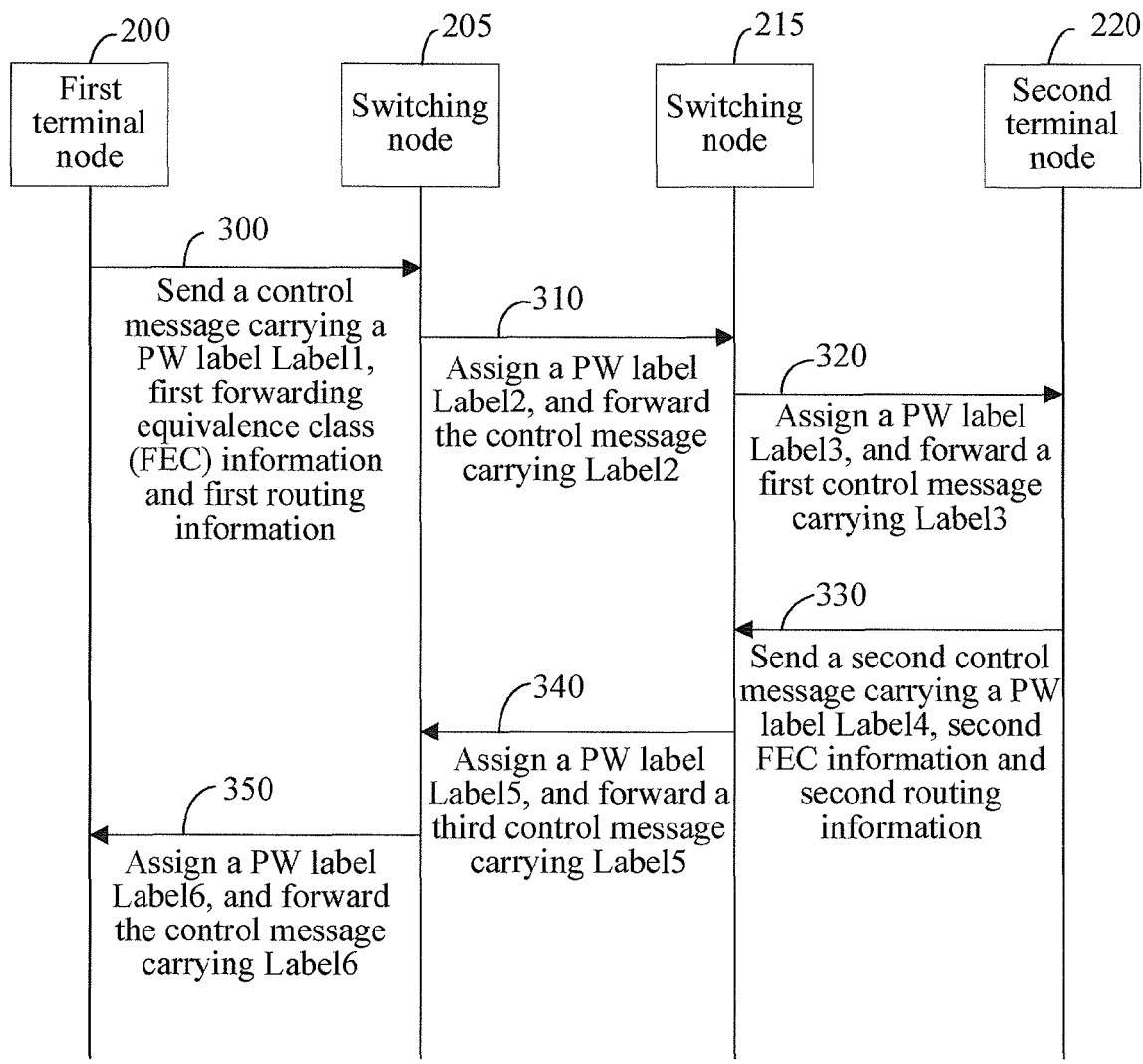
FIG. 3 is a flow chart of a method for establishing a PW according to an embodiment of the present invention.
FIG. 4 is a schematic structural diagram of an FEC according to an embodiment of the present invention.

The first FEC information is shown in FIG. 4, which includes, but is not limited to:

a Source Attachment Individual Identifier (SAII), which includes, but is not limited to, a global ID, a prefix and an attachment circuit identifier (AC ID), where the global ID is unique to equipment providers and is used to guarantee the uniqueness of a terminal node; the prefix is used to identify a source terminal node and may be assigned by suppliers or be obtained from a loop back address of the terminal node; and a Target Attachment Individual Identifier (TAII), which includes, but is not limited to, a global ID, a prefix and an AC ID, where the global ID is unique to equipment providers and is used to guarantee the uniqueness of a terminal nodes; the prefix is used to identify a target terminal node and may be assigned by suppliers or be obtained from a loop back address of the terminal node.

Persons skilled in the art should know that in this embodiment, for specific content of the first FEC information, the information carried by the SAII in the control message may be used to identify the first terminal node 200, and the information carried by the TAII may be used to identify the second terminal node 220.

The first routing information carries identification information of switching nodes between the first terminal node 200 and the second terminal node 220 to establish a PW. In this embodiment, the first routing information carries identification information of the switching node 205 and the switching node 215. The first routing information may be carried in a Type-Length-Value (TLV) parameter of the control message. A structure of the TLV parameter carrying the first routing information may be shown in Table 1.

TABLE 1

TYPE
Length
Identification information
of the switching node 205
Identification information
of the switching node 215

A structure of the TLV parameter carrying the first routing information may also be shown in Table 2.

TABLE 2

TYPE
Length
ER-hop TLV1
ER-hop TLV2

A structure of the ER-hop TLV parameter is shown in Table 3.

TABLE 3

TYPE
Length
L
Content

The value of Content of the ER-hop TLV1 is the identification information of the switching node 205, and the value of Content of the ER-hop TLV2 is the identification information of the switching node 215.

The identification information of the switching node may be an equipment ID or an IP address of the switching node, or one of other identification information of the switching node.

The first terminal node 200 sends the control message to a corresponding switching node, which is the switching node 205 in this embodiment, according to the identification information of a first switching node in the first routing information.

Step 310: The switching node 205 assigns a PW label Label2, and sends the control message carrying Label2 to the switching node 215.

After receiving the control message, the switching node 205 analyzes the first routing information in the control message, obtains the PW label Label1 in the control message, and saves the PW label Label1 As a PW label assigned to this switching node by the first terminal node 200, Label1 is used to identify a segmented PW from this switching node to the first terminal node 200. The switching node 205 assigns a PW label Label2, a format of which may be similar to that of an LSP label, and may be the same as that of Label1 or may be different from that of Label1.

The switching node 205 constructs a control message carrying Label2, the first FEC information and the first routing information, obtains identification information of a next switching node of the identification information of the switching node 205 in the first routing information, and sends the control message carrying Label2 to a switching node corresponding to the obtained identification information, that is, the switching node 215 in this embodiment.

Step 320: The switching node 215 assigns a PW label Label3, and sends the first control message carrying Label3 to the second terminal node 220.

After receiving the control message, the switching node 215 analyzes the first routing information in the control message, obtains the PW label Label2 in the control message, and saves the PW label Label2. As a PW label assigned to this switching node by the switching node 205, Label2 is used to identify a segmented PW from this switching node to the switching node 205. The switching node 215 assigns a PW label Label3, a format of which may be similar to that of the LSP label, and may be the same as that of Label2 or may be different from that of Label2. The switching node 215 constructs the first control message carrying Label3, the first FEC information and the first routing information.

The switching node 215 obtains next identification information of the identification information of the switching node 215 in the first routing information. A next ID does not exist, so the switching node 215 reads a value of a TAII field of the first FEC information in the first control message, and sends the first control message carrying Label3 to the second terminal node 220 according to the obtained value.

Step 330: The second terminal node 220 constructs a second control message carrying a PW label, second FEC information and second routing information, and sends the second control message to the switching node 215.

The second terminal node 220 saves Label3, which is assigned to the second terminal node 220 by the switching node 215. Label 3 is used to identify a segmented PW between the switching node 215 and the second terminal node 220.

The second terminal node 220 assigns a PW label Label4, and constructs the second control message carrying Label4, the second FEC information and the second routing information, where Label4 may be the same as Label3 or may be different from Label3, and a format of Label4 may be similar to that of an LSP label.

The method of constructing the second control message by the second terminal node 220 is as follows:

(1) If the second FEC information is configured on the second terminal node 220, an SAII field of the second FEC information carries identification information of the second terminal node 220, and the TAII field carries identification information of the first terminal node 200. The second terminal node 220 analyzes the first routing information in the first control message, and generates the second routing information based on the first routing information. The generated second routing information carries the identification information of the switching node in the first routing information. The second routing information may be included in a TLV parameter, and a structure of the TLV parameter may be shown in Table 4.

TABLE 4

| TYPE |
| --- |
| Length |
| Identification information of the switching node 215 |
| Identification information of the switching node 205 |

The structure may also be shown in Table 5.

TABLE 5

| TYPE |
| --- |
| Length |
| ER-hop TLV2 |
| ER-hop TLV1 |

The structures of the ER-hop TLV2 and the ER-hop TLV1 have been described in Table 3. A Content field of the ER-hop TLV2 carries the identification information of the switching node 215, and a Content field of the ER-hop TLV1 carries the identification information of the switching node 205.

The second terminal node 220 constructs the second control message carrying the second FEC information, Label4 and the second routing information.

(2) When the second terminal node 220 configures the second FEC information, a value of the TAII field in the second FEC information is not configured. In contrast, the second terminal node 220 obtains a value of the SAII field of the first FEC information based on learning the first FEC information in the first control message. Then the TAII of the second FEC information has the same value with the value of the SAII field of the first FEC information obtained by learning.

The second terminal node 220 generates the second routing information according to the first routing information in the first control message. First, the second terminal node 220 analyzes the first routing information in the first control message and generating the second routing information that is shown in Table 4 or Table 5.

The second terminal node 220 constructs the second control message carrying the second FEC information, Label4 and the second routing information.

The choosing of the above two methods depends on a policy set on the second terminal node 220. For example, no matter whether the second FEC information is configured with the value of the TAII, the second terminal node 220 needs to analyze the first FEC information. The second terminal node 220 may also determine which method to choose. For example, when the value of the TAII is configured in the second FEC information on terminal node 220, the second terminal node 220 chooses the first method; when the value of the TAII is not configured in the second FEC information, the second terminal node 220 chooses the second method.

The second terminal node 220 sends the second control message to a corresponding switching node, which is the switching node 215 in this embodiment, according to the first identification information in the second routing information.

Step 340: The switching node 215 assigns a PW label Label5, and sends a third control message carrying Label5 to the switching node 205.

After receiving the second control message, the switching node 215 analyzes the second routing information in the second control message, obtains Label4 in the second control message, and saves Label4. The Label 4 is used as a PW label, which is assigned to this switching node by the second terminal node 220. Label4 is used to identify a segmented PW from this switching node to the second terminal node 220. The switching node 215 assigns the PW label Label5, which may be the same as Label4 or may be different from Label4. The switching node 215 constructs the third control message carrying Label5, the second FEC information and the second routing information, obtains next identification information of the identification information of the switching node 215 in the second routing information, and sends the third control message carrying Label5 to a switching node corresponding to the obtained next identification information, which is the switching node 205 in this embodiment.

Step 350: The switching node 205 assigns a PW label Label6, and sends a control message carrying Label6 to the first terminal node 200.

After receiving the third control message, the switching node 205 analyzes the routing information of the switching node in the third control message, obtains the PW label Label5 in the third control message, and saves the PW label Label5. As a PW label assigned to this switching node by the switching node 215, Label5 is used to identify a segmented PW from this switching node to the switching node 215. The switching node 205 assigns a PW label Label6, which may be the same as Label5 or may be different from Label5. The switching node 205 constructs a control message carrying Label6, the second FEC information and the second routing information, obtains next identification information of the identification information of the switching node 205. The next identification information does not exist, so the switching node 205 reads the value of the TAII field in the second FEC information of the control message, and sends the second control message carrying Label6 to the first terminal node 200 according to an obtained value.

The first terminal node 200 saves Label6 as the PW label assigned to the first terminal node 200 by the switching node 205.

Through the above steps, a bidirectional PW is established between the first terminal node 200 and the second terminal node 220. In this method, the intermediate switching nodes may forward a message according to the routing information carrying the routing information of the intermediate switching nodes in the control message. Therefore, during the establishing process of the PW, it is unnecessary to additionally configure the PW routing node statically on the switching node, or dynamically establish the PW routing table. Absolutely, it is unnecessary to manually configure mapping relations between PWs.

Figure 5:
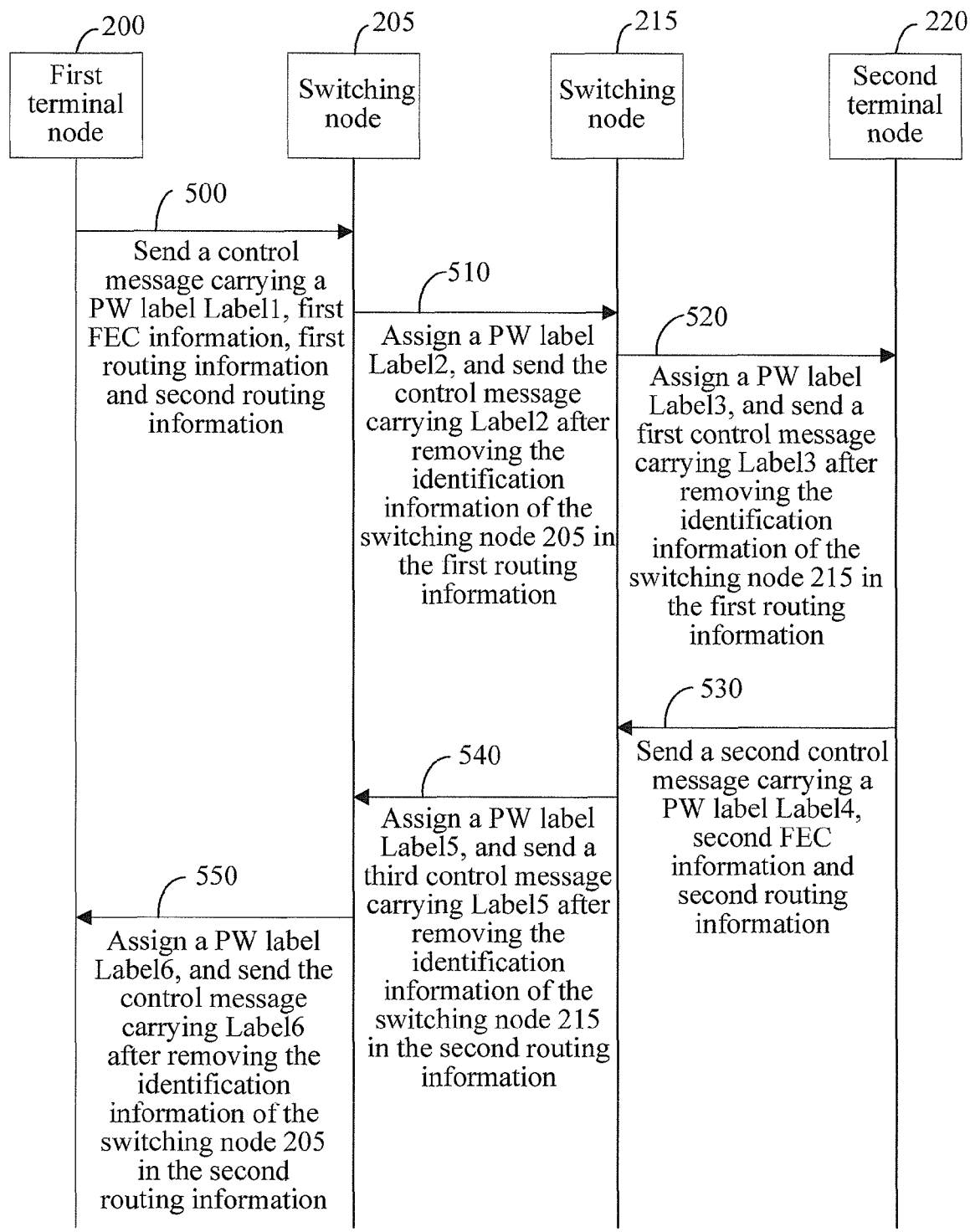
FIG. 5 is a flow chart of a method for establishing a PW according to an embodiment of the present invention.

When the PW between the first terminal node 200 and the second terminal node 220 is being established, the first routing information in the first control message needs to be analyzed. Based on that, the second terminal node 220 sends the second control message. Then, the second routing information including the identification information of the switching node could be carried in the first control message, rather than be constructed additionally. In this way the second terminal node 220 may directly read the second routing information in the first control message. A specific process of the method is shown in FIG. 5, which includes the following steps:

Step 500: The first terminal node 200 constructs the control message carrying the PW label, the first FEC information, the first routing information and the second routing information, and sends the control message to the switching node 205 according to the first routing information.

The first terminal node 200 assigns a PW label Label1 to the second terminal node 220, and the format of Label1 may be similar to that of an LSP label.

The first FEC information is shown in FIG. 4, which includes the identification information of the first terminal node 200 and the second terminal node 220.

The first routing information carries the identification information of the switching node 205 and the switching node 215, and a structure may be shown in Table 1 or Table 2.

The second routing information carries the identification information of the switching node 215 and the switching node 205, and a structure may be shown in Table 4 or Table 5.

The first terminal node 200 sends the control message to a corresponding switching node, which is the switching node 205 in this embodiment, according to the first identification information of the first routing information.

Step 510: The switching node 205 assigns a PW label Label2, and sends the control message carrying Label2 to the switching node 215 after removing the identification information of the switching node 205 in the first routing information.

After receiving the control message, the switching node 205 analyzes the first routing information in the control message, obtains the PW label Label1 in the control message, saves the PW label Label1, assigns a PW label Label2, obtains the identification information of the next switching node of the identification information (the first identification information) of the switching node 205 in the first routing information, removes the identification information of the switching node 205 in the first routing information in the control message, constructs the control message carrying Label2, the first FEC information, the second routing information, and the first routing information from which the identification information of the switching node 205 is removed, and sends a processed control message to a corresponding switching node, which is the switching node 215 in this embodiment, according to the obtained identification information of the next switching node.

Step 520: The switching node 215 assigns a PW label Label3, and sends the first control message carrying Label3 to the second terminal node 220 after removing the identification information of the switching node 215 in the first routing information.

After receiving the control message, the switching node 215 analyzes the first routing information in the first control message, obtains the PW label Label2 in the first control message, saves the PW label Label2, assigns a PW label Label3, and obtains the next identification information of the identification information (the first identification information) of the switching node 215 in the first routing information. The next identification information does not exist, so the switching node 215 reads the value of the TAII field in the first FEC information in the first control message, removes the identification information of the switching node 215 in the first routing information, constructs the first control message carrying Label3, the first FEC information, the second routing information, and the first routing information from which the identification information of the switching node 215 is removed, and sends the first control message carrying Label3 to the second terminal node 220 according to an obtained value of the TAII.

Step 530: The second terminal node 220 constructs the second control message including the PW label Label4, the second FEC information and the second routing information, and sends the second control message.

After receiving the first control message, the second terminal node 220 assigns the PW label Label4, and constructs the second control message according to the first control message, where Label4 may be the same as Label3 or may be different from Label3.

The method of constructing the second control message by the second terminal node 220 is as follows:

(1) If the second FEC information is configured on the second terminal node 220, the SAII field of the second FEC information carries the identification information of the second terminal node 220, and the TAII field carries the identification information of the first terminal node 200, the second terminal node 220 reads the second routing information in the first control message.

The second terminal node 220 constructs the second control message carrying the second FEC information, Label4 and the second routing information.

(2) When the second terminal node 220 configures the second FEC information, the value of the SAII in the second FEC information is configured, the second terminal node 220 learns the first FEC information in the first control message, obtains the value of the SAII field of the first FEC information, and assigns the value of the SAII field obtained by learning to the TAII in the second FEC information.

The second terminal node 220 reads the second routing information in the first control message.

The second terminal node 220 constructs the second control message carrying the second FEC information, Label4 and the second routing information.

The second terminal node 220 sends the second control message to a corresponding switching node, which is the switching node 215 in this embodiment, according to the identification information of the first switching node in the second routing information.

Step 540: The switching node 215 assigns the PW label Label5, and sends the third control message carrying Label5 to the switching node 205 after removing the identification information of the switching node 215 in the second routing information.

After receiving the second control message, the switching node 215 analyzes the second routing information in the second control message, obtains Label4 in the second control message, saves Label4, assigns the PW label Label5, obtains the next identification information of the identification information (the first identification information) of the switching node 215 in the second routing information in the second control message, removes the identification information of the switching node 215 in the second routing information, constructs the third control message carrying Label5, the second FEC information, and the second routing information from which the identification information of the switching node 215 is removed, and sends the third control message carrying Label5 to a switching node, which is the switching node 205 in this embodiment, corresponding to the obtained next identification information.

Step 550: The switching node 205 assigns the PW label Label6, and sends the control message carrying Label6 to the first terminal node 200 after removing the identification information of the switching node 205 in the second routing information.

After receiving the third control message, the switching node 205 analyzes the routing information of the switching node in the third control message, obtains Label5 in the third control message, saves Label5, assigns the PW label Label6, obtains the next identification information of the identification information (the first identification information) of the switching node 205 in the second routing information in the third control message. The next identification information does not exist, so the switching node 205 reads the value of the TAII field in the second FEC information in the third control message, removes the identification information of the switching node 205 in the second routing information, constructs the control message carrying Label6, the second FEC information, and the second routing information from which the identification information of the switching node 205 is removed, and sends the control message carrying Label6 to the first terminal node 200 according to the obtained TAII value.

Through the above process, a PW between the first terminal node 200 and the second terminal node 220 is established. Compared with the first method, in this method by carrying returned routing information in the control message, the second terminal 220 does not need to additionally analyze the first control message, and the intermediate switching node removes the identification information of the intermediate switching node, after obtaining the next switching node. Therefore, the ID of the next switching node is always the first one, so that the processing process of the intermediate switching node becomes simpler.

Figure 6:
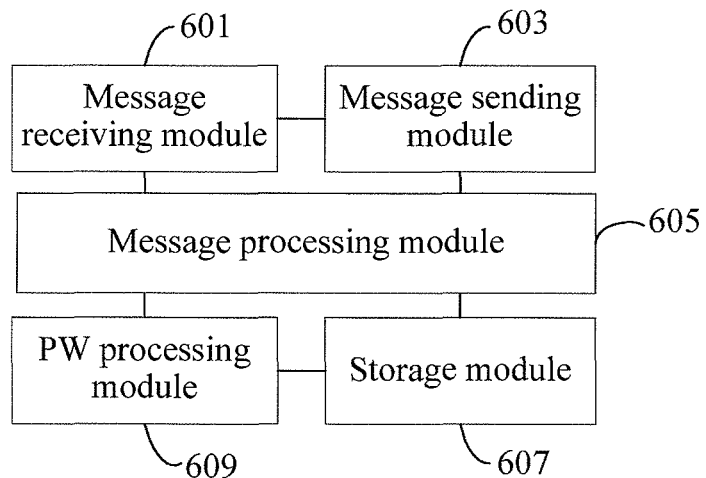
FIG. 6 is a schematic structural diagram of a terminal node according to an embodiment of the present invention.

An embodiment provides a terminal node, which may be used to initiate a process of establishing a PW actively, or may be used in a process of passively establishing a PW. As shown in FIG. 6, the terminal node includes a message receiving module 601, a message sending module 603, a message processing module 605 and a storage module 607, and may also include a PW processing module 609.

When the terminal node is used in the process of passively establishing a PW, functions of each module are as follows:

The message receiving module 601 is configured to receive a first control message from a switching node. The first control message carries a PW label assigned by the switching node, first FEC information and first routing information, where the first routing information carries identification information of the switching node and the routing information is used by the switching node to send the first control message.

The first routing information may be included in a TLV parameter, and a structure of the TLV parameter may be shown in Table 1 or Table 2. The first control message may be an existing Label Mapping message.

The content of the first FEC information may be shown in FIG. 4, which includes identification information of a first terminal node and this terminal node.

The storage module 607 is configured to store preconfigured second FEC information, and a structure of the second FEC information may be shown in FIG. 4. In FIG. 4, Values of SAII and TAII may be preconfigured; or only the value of the SAII is preconfigured and the value of the TAII is obtained by learning the first control message.

The storage module 607 may also be configured to store the identification information of an adjacent node.

The PW processing module 609 is configured to assign a PW label, and a format of the assigned PW label may be similar to that of an LSP label.

The message processing module 605 is configured to construct a second control message according to the first control message received by the message receiving module 601.

The message processing module 605 may further include a reading module and a message constructing module. The reading module is configured to read the second FEC information in the storage module 607, and the read second FEC information is used by the message constructing module to construct the second control message.

The message constructing module is configured to construct the second control message according to the first control message. The methods of constructing the second control message are as follows:

(1) Learning is performed on the first control message to obtain the value of the SAII in the first FEC information in the first control message, and the obtained value of the SAII is assigned to the TAII field in the second FEC information read by the reading module. The process of generating the second routing information according to the first routing information may include: creating a TLV parameter, reading a TLV parameter (an original TLV parameter) including the identification information of the switching node in the first control message, obtaining the identification information of the switching node in the original TLV parameter, and adding the obtained identification information of the switching node into the created TLV parameter according to the format described in Table 4 or Table 5.

The second control message carrying the PW label assigned by the PW processing module 609, the second FEC information and the second routing information is constructed.

(2) The message constructing module may not learn the first control message, and pre-configures the value of the TAII of the second FEC in the storage module 607 instead.

The message constructing module generates the second routing information according to the first routing information in the first control message. The process of generating the second routing information is described above.

The message constructing module constructs the second control message carrying the PW label assigned by the PW processing module 609, the second routing information and the second FEC information that is stored by the storage module 607.

In another embodiment, the first control message received by the message receiving module 601 carries the second routing information in addition to the first routing information. The reading module of the message processing module 605 is further configured to read the second routing information in the first control message. The following two methods of constructing the second control message by the message constructing module may be used:

(1) Learning is performed on the first control message to obtain the value of the SAII in the first FEC information in the first control message, and the obtained value of the SAII is assigned to the TAII field in the second FEC information read by the reading module.

The second control message carrying the PW label assigned by the PW processing module 609, the second FEC information and the second routing information that is read by the reading module is constructed.

(2) If the second FEC information stored by the storage module 607 is configured with the values of the SAII and TAII, the message constructing module constructs the second control message carrying the PW label assigned by the PW processing module 609, the second FEC information read by the reading module and the second routing information.

The message sending module 603 is configured to send the second control message constructed by the message processing module 605 to a corresponding switching node, so as to establish the PW between this terminal node and the first terminal node.

The message sending module 603 sends the second control message to a corresponding switching node according to the identification information of the first switching node in the second routing information, and the switching node sends the second control message to a corresponding node.

When the terminal node is used in the process of actively establishing the PW, functions of each module are as follows:

The storage module 607 is configured to store preconfigured first FEC information, and a structure of the first FEC information may be shown in FIG. 4. The values of the SAII and TAII are preconfigured in the first FEC information. The value of the SAII includes the identification information of this terminal node, and the value of the TAII includes the identification information of the second terminal node.

The storage module 607 is further configured to store identification information of an adjacent node and the first routing information. The first routing information carries the identification information of the switching nodes between this terminal node and the second terminal node.

The function of the PW processing module 609 is the same as that of the PW processing module 609 when the terminal node is used in the process of passively establishing the PW, which has been described above and is not repeated herein.

The message processing module 605 is configured to construct the first control message.

The reading module in the message processing module 605 is configured to read the first FEC information and the first routing information in the storage module 607.

The message constructing module in the message processing module 605 is configured to construct the control message according to the first FEC information read by the reading module. The constructed control message includes the first FEC information, the first routing information and the PW label assigned by the PW processing module 609.

The message constructing module in the message processing module 605 may further be configured to construct the second routing information. The sequence of the identification information of the switching nodes in the second routing information may be reverse to that of the identification information of the switching nodes in the first routing information.

The message sending module 603 is configured to send the control message constructed by the message processing module 605 to a corresponding switching node according to the first routing information, so as to establish the PW between this terminal node and the second terminal node.

Specifically, the message sending module 603 sends the control message to a corresponding switching node according to the identification information of the first switching node in the first routing information, and the switching node sends the control message to a corresponding node.

The terminal node provided in this embodiment may receive a control message carrying routing information. The identification information of the switching node is carried in the routing information, so after receiving the message, the switching node may obtain the identification information of the next node by analyzing the message, and send the control message to the next node according to the identification information of the next node. The process is automatically performed by the switching node, without additionally configuring routing table information to establish the PW and without additionally configuring mapping relations between PW labels.

Figure 7:
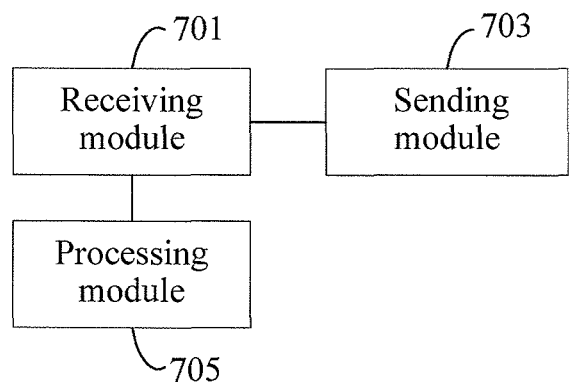
FIG. 7 is a schematic structural diagram of a switching node according to an embodiment of the present invention.

An embodiment further provides a switching node, which includes a receiving module 701, a sending module 703 and a processing module 705, as shown in FIG. 7.

The receiving module 701 is configured to receive the control message which carries the PW label assigned by the terminal node or the switching node, the FEC information and the routing information. The routing information carries the identification information of the switching node, and may be included in the TLV parameter in the control message.

The processing module 705 is configured to process the control message received by the receiving module 701, which includes obtaining identification information of a next hop node on a PW routing according to the routing information in the control message.

The processing module 705 may include a reading module and a judging module.

The reading module is configured to read the next identification information of the identification information of the switching node in the routing information carried by the control message.

The reading module is further configured to read the PW label carried by the control message, and assign a PW label. The assigned PW label may be the same as the PW label in the control message or may be different from the PW label in the control message.

The judging module is configured to judge whether the identification information read by the reading module is null, and if the identification information read by the reading module is null, notify the reading module of reading the value of the TAII field in the FEC information carried by the control message, in which the value of the TAII field could be used as the identification information of the next hop node.

In another embodiment, the reading module is further configured to remove the identification information of the switching node from the routing information after reading the next identification information of the identification information of the switching node in the routing information, so that the identification information of the next switching node is the first identification information in the routing information.

The sending module 703 is configured to send the control message according to the identification information obtained by the processing module.

The switching node provided in this embodiment may send the message according to the routing information of the intermediate switching node carried in the control message after receiving the control message for establishing the PW, so that it is unnecessary to set the PW routing table information required for establishing the PW on the switching node and it is also unnecessary to configure mapping relations between each segment of the PW.

Figure 8:
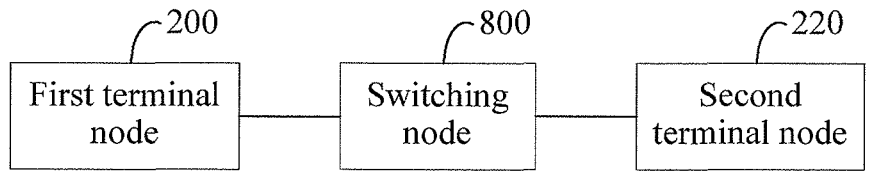
FIG. 8 is a schematic diagram of a system for establishing a PW according to an embodiment of the present invention.

An embodiment of the present invention provides a system for establishing a PW, which includes a first terminal node 200, a second terminal node 220 and a switching node 800, as shown in FIG. 8. The first terminal node 200 is connected to the second terminal node 220 through the switching node 800.

The first terminal node 200 is configured to construct a control message, where the control message carries a PW label assigned by the first terminal node, first FEC information and first routing information, and send the control message to the switching node 800 according to the first routing information.

The switching node 800 is configured to receive the control message from the first terminal node 200, process the control message, obtain identification information of a next hop node on a PW route in a direction from the first terminal node 200 to the second terminal node 220, and send a first control message according to the obtained identification information; receive a second control message from the second terminal node 220, process the second control message, obtain identification information of a next hop node on a PW route in a direction from the second terminal node 220 to the first terminal node 200, and send a third control message according to the obtained identification information of the next hop node.

The switching node 800 obtains the identification information of the next hop node on the PW route in the direction from the first terminal node 200 to the second terminal node 220, which includes: obtaining next identification information of the identification information of the switching node 800 in the control message, using the obtained next identification information as the identification information of the next hop node on the PW route, and when the obtained next identification information is null, obtaining identification information of a target terminal node of the first FEC information in the control message, in which the identification information of the target terminal node is used as the identification information of the next hop node on the PW route. The process of obtaining the identification information of the next hop node on the PW route in the direction from the second terminal node 220 to the first terminal node 200 by the switching node is similar to that of obtaining the identification information of the next hop node on the PW route in the direction from the first terminal node 200 to the second terminal node 220, and is not repeated herein.

The second terminal node 220 is configured to receive the first control message, construct the second control message according to the first control message, and send the second control message to the switching node 800. The switching node 800 sends the third control message to the first terminal node 200 according to the second routing information in the received second control message, to establish the PW between the second terminal node and the first terminal node.

After the second terminal node 220 receives the first control message, the PW label is assigned. The constructing the second control message according to the first control message is performed by two methods as follows:

(1) Learning is performed on the first control message to obtain the value of the SAII in the first FEC information in the first control message, and the obtained value of the SAII is assigned to the TAII field in the second FEC information pre-stored on the second terminal node 220. The process of generating the second routing information according to the first routing information may include: creating a TLV parameter, reading the TLV parameter (the original TLV parameter) including the identification information of the switching node in the first control message, obtaining the identification information of the switching node in the original TLV parameter, and adding the obtained identification information of the switching node into the created TLV parameter according to the format described in Table 4 or Table 5.

The second control message carrying the PW label assigned by the second terminal node 220, the second FEC information and the second routing information is constructed.

(2) The learning may not be performed on the first control message, and instead the value of the TAII of the second FEC information is pre-configured on the second terminal node 220. The second terminal node 220 generates the second routing information according to the first routing information in the first control message. The process of generating the second routing information is described above.

The second control message carrying the PW label assigned by the second terminal node 220, the second FEC information and the second routing information is constructed.

After the second control message is constructed, the second terminal node 220 sends the second control message to a corresponding switching node according to the second routing information. For example, the second terminal node 220 sends the second control message to a corresponding switching node according to the first identification information in the second routing information.

In another embodiment, when a control message is constructed by the first terminal node 200, the control message includes the second routing information in addition to carrying the PW label, the first FEC information and the first routing information. The second routing information carries the identification information of the switching node on the PW route in the direction from the second terminal node 220 to the first terminal node 200. The sequence of the identification information of the switching node carried by the second routing information may be reverse to that of the identification information of the switching node carried by the first routing information. In this way, after the second terminal node 220 receives the control message, it is unnecessary to additionally generate the second routing information, and the second routing information in the control message is directly read.

After the first routing information and the second routing information are carried in the control message, in the direction from the first terminal node 200 to the second terminal node 220, the switching node 800 may further read identification information of a next hop node, and remove the identification information of the switching node 800 in the first routing information, to make the identification information of the next switching node on the PW route in the direction from the first terminal node 200 to the second terminal node 220 be the first in the first routing information; in the direction from the second terminal node 220 to the first terminal node 200, the switching node 800 may further remove the identification information of the switching node 800 in the second routing information after reading identification information of a next hop node, to make the identification information of the next switching node on the PW route in the direction from the second terminal node 220 to the first terminal node 200 be the first in the second routing information.

In the system for establishing the PW provided in this embodiment, the identification information of the intermediate switching node on the PW route is carried in the control message sent by the first terminal node. The intermediate node may send the control message according to the identification information of the switching node and forward the identification information of the intermediate node on the PW route. In this way, it is unnecessary to additionally configure a PW routing table required for establishing a PW. Meanwhile, by carrying PW routing information in the direction from the second terminal node to the first terminal node in the control message of the first terminal node, the method for constructing the control message by the second terminal node becomes simple.

The embodiments or part of the embodiments of the present invention may be implemented by using software. A corresponding software program may be saved in readable storage media, such as an optical disk, a hard risk, a floppy disk and so on.

The above descriptions are several specific embodiments of the present invention, which the present invention is not limited to. Any changes that persons skilled in the art may think of should fall within the protection scope of the present invention.

What is claimed is:

1. A method for establishing a Pseudo Wire (PW), the method comprising:
   receiving, by a first switching node, a first control message comprising a first PW label, Forwarding Equivalence Class (FEC) information and first routing information, wherein the first routing information comprises an identifier of the first switching node which is required to be passed for establishing a Multi-Segment Pseudo Wire (MS-PW) from a first terminal node to a second terminal node, the first control message comprises an identifier of a next-hop of the first switching node and the next-hop is a node in the MS-PW, and the FEC information comprises an identifier of the second terminal node;
   if there is no further identifier following the identifier of the first switching node in the first routing information, obtaining the identifier of the second terminal node from the FEC information as the identifier of the next hop;
   deleting the identifier of the first switching node from the first routing information;
   based on the deletion of the identifier of the first switching node from the first routing information, constructing a second control message comprising a second PW label and the FEC information; and
   sending the second control message to the next-hop corresponding to the identifier of the next-hop.

2. The method according to claim 1, wherein if the first routing information further comprises an identifier of a second switching node and the second switching node is the next-hop of the first switching node in the MS-PW, the method further comprising:
   obtaining the identifier of the second switching node from the first routing information as the identifier of the next-hop.

3. A first switching node, comprising:
   a receiver, configured to receive a first control message comprising a first Pseudo Wire (PW) label, Forwarding Equivalence Class (FEC) information and first routing information, wherein the first routing information comprises an identifier of the first switching node which is required to be passed for establishing a Multi-Segment Pseudo Wire (MS-PW) from a first terminal node to a second terminal node, the first control message comprises an identifier of a next-hop of the first switching node and the next-hop is a node in the MS-PW, and the FEC information comprises an identifier of the second terminal node;
   a message compiler, configured to obtain the identifier of the second terminal node from the FEC information as the identifier of the next-hop if there is no further identifier following the identifier of the first switching node in the first routing information, delete the identifier of the first switching node from the first routing information and construct a second control message based on the deletion of the identifier of the first switching node from the first routing information, wherein the second control message comprises a second PW label and the FEC information; and
   a transmitter, configured to send the second control message to the next-hop corresponding to the identifier of the next-hop.

4. The first switching node according to claim 3, wherein
   the message compiler is further configured to obtain an identifier of a second switching node from the first routing information as the identifier of the next-hop if the first routing information further comprises the identifier of the second switching node and the second switching node is the next-hop of the first switching node in the MS-PW.

5. A computer program product for use in a first switching node, the computer program product comprising computer executable instruction, stored on a non-transitory computer readable medium, such that when executed by a computer program processor, cause the first switching node to perform the following:
   receive a first control message comprising a first PW label, Forwarding Equivalence Class (FEC) information and first routing information, wherein the first routing information comprises an identifier of the first switching node which is required to be passed for establishing a Multi-Segment Pseudo Wire (MS-PW) from a first terminal node to a second terminal node, the first control message comprises an identifier of a next-hop of the first switching node and the next-hop is a node in the MS-PW, and the FEC information comprises an identifier of the second terminal node;
   obtain the identifier of the second terminal node from the FEC information as the identifier of the next-hop if there is no further identifier following the identifier of the first switching node in the first routing information;
   delete the identifier of the first switching node from the first routing information;
   based on the deletion of the identifier of the first switching node from the first routing information, construct a second control message comprising a second PW label and the FEC information; and
   send the second control message to the next-hop corresponding to the identifier of the next-hop.

6. The computer program product according to claim 5, wherein
   the first switching node is further caused to obtain an identifier of a second switching node from the first routing information as the identifier of the next-hop if the first routing information further comprises the identifier of the second switching node and the second switching node is the next-hop of the first switching node in the MS-PW.

* * * * *